United States Patent
Wang et al.

(10) Patent No.: US 11,208,327 B2
(45) Date of Patent: Dec. 28, 2021

(54) PROCESS FOR THE LARGE-SCALE MANUFACTURE OF ZEOLITE-TEMPLATED CARBON

(71) Applicants: SAUDI ARABIAN OIL COMPANY, Dhahran (SA); Korea Advanced Institute of Science and Technology, Daejeon (KR)

(72) Inventors: Yuguo Wang, Dhahran (SA); Rashid M. Othman, Khobar (SA); Minkee Choi, Daejeon (KR); Seokin Choi, Daejeon (KR)

(73) Assignees: SAUDI ARABIAN OIL COMPANY; KOREA ADVANCED INSTITUTE OF SCIENCE AND TECHNOLOGY

( * ) Notice: Subject to any disclaimer, the term of this patent is extended or adjusted under 35 U.S.C. 154(b) by 187 days.

(21) Appl. No.: 16/741,885

(22) Filed: Jan. 14, 2020

(65) Prior Publication Data
US 2021/0214224 A1    Jul. 15, 2021

(51) Int. Cl.
*B01J 8/00* (2006.01)
*B01J 8/18* (2006.01)
(Continued)

(52) U.S. Cl.
CPC ............ *C01B 32/05* (2017.08); *B01J 8/1836* (2013.01); *B01J 8/24* (2013.01); *C01B 39/22* (2013.01);
(Continued)

(58) Field of Classification Search
CPC ..... B01J 8/00; B01J 8/18; B01J 8/1836; B01J 8/24; B01J 19/24; B01J 2208/00;
(Continued)

(56) References Cited

U.S. PATENT DOCUMENTS

| 8,657,923 B2 | 2/2014 | Ito et al. |
| 9,562,649 B2 | 2/2017 | Wang et al. |

(Continued)

FOREIGN PATENT DOCUMENTS

| EP | 2841843 A1 | 3/2015 |
| JP | 2013159526 A | 8/2013 |

(Continued)

OTHER PUBLICATIONS

Benzigar, et al., "Recent advances in functionalized micro and mesoporous carbon materials: synthesis and applications," Chem. Soc. Rev., vol. 47, issue 8, pp. 2680-2721 (2018).

(Continued)

*Primary Examiner* — Natasha E Young
(74) *Attorney, Agent, or Firm* — Bracewell LLP; Constance Gall Rhebergen; Jill A. Hecht

(57) ABSTRACT

A method for the large-scale synthesis of a zeolite-templated carbon (ZTC). The method includes the steps of: introducing a bed material comprising a zeolite to a fluidized bed reactor and heating the bed material to a temperature between 550° C. and 800° C.; fluidizing the bed material with a fluidizing gas and maintaining the temperature of the bed material between 550° C. and 800° C.; introducing an organic carbon precursor while fluidizing the zeolite for a period of time such that carbon is deposited on the zeolite by chemical vapor deposition to produce a zeolite-carbon composite; and treating the zeolite-carbon composite with an acid solution such that the zeolite template is dissolved and the ZTC is obtained.

20 Claims, 14 Drawing Sheets

(51) Int. Cl.
*B01J 8/24* (2006.01)
*B01J 19/00* (2006.01)
*B01J 19/24* (2006.01)
*C01B 32/00* (2017.01)
*C01B 32/05* (2017.01)
*C01B 39/00* (2006.01)
*C01B 39/02* (2006.01)
*C01B 39/20* (2006.01)
*C01B 39/22* (2006.01)
*C01B 39/26* (2006.01)

(52) U.S. Cl.
CPC ............... *B01J 2208/00017* (2013.01); *B01J 2208/00548* (2013.01); *B01J 2219/00006* (2013.01); *C01P 2002/72* (2013.01); *C01P 2004/60* (2013.01)

(58) Field of Classification Search
CPC .... B01J 2208/00008; B01J 2208/00017; B01J 2208/00548; B01J 2219/00; B01J 2219/00002; B01J 2219/00004; B01J 2219/00006; C01B 32/00; C01B 32/05; C01B 39/00; C01B 39/02; C01B 39/20; C01B 39/22; C01B 39/26
See application file for complete search history.

(56) References Cited

U.S. PATENT DOCUMENTS

| | | | |
|---|---|---|---|
| 9,604,194 | B2 | 3/2017 | Wang et al. |
| 10,302,254 | B2 | 5/2019 | Wang et al. |
| 2013/0283854 | A1 | 10/2013 | Wang et al. |
| 2016/0101407 | A1 | 4/2016 | Wang et al. |
| 2017/0225147 | A1 | 8/2017 | Wang et al. |
| 2017/0259250 | A1* | 9/2017 | Tanaka .................. F01N 3/2066 |

FOREIGN PATENT DOCUMENTS

| | | |
|---|---|---|
| JP | 2015521257 A | 7/2015 |
| JP | 6482054 B2 | 3/2019 |
| WO | WO-9115427 A1 * 10/1991 ......... C01B 33/2815 |
| WO | 2013163365 A1 | 10/2013 |
| WO | 2014210147 A1 | 12/2014 |

OTHER PUBLICATIONS

Choi, et al., Large-scale synthesis of high-quality zeolite-tern plated carbons without depositing external carbon layers, Chemical Engineering Journal 280 (2015) 597-605.

Choi, et al., Unique thermal contraction of zeolite-templated carbons enabling micropore size tailoring and its effects on methane storage, Carbon 141 (2019) 143-153.

Elles-Perez, et al., "Evaluation of heavy crude oil from a water-oil model system as starting material for the preparation of adsorbents type NaY zeolite-templated carbon," J. of Environmental Management, vol. 196, pp. 466-475 (2017).

Lee, et al., "Ultramicroporous carbon synthesis using lithium ion effect in ZSM-5 zeolite template," Chem. Mater., vol. 30, issue 18, pp. 6513-6520 (2018).

Nishihara, et al., "Zeolite-templated carbons—three-dimensional microporous graphene frameworks," Chem. Commun., vol. 54, issue 45, pp. 5648-5673 (2018).

Stadie, et al., "Zeolite-Templated Carbon as an Ordered Microporous Electrode for Aluminum Batteries," ACS Nano, vol. 11, issue 2, pp. 1911-1919 (2017).

Teng, et al., "Isostatic Pressure Assisted Nanocasting Preparation of Zeolite Templated Carbon for High-Performance and Ultrahigh Rate Capability Supercapacitors," J. Mater. Chem. A, vol. 6, issue 39, p. 18938-18947 (2018).

Zhao, et al., "Characterization of multi-walled carbon nanotubes (MWNTs) synthesized by CCVD using zeolite template from acetylene," J. Ceramic Soc. Japan, vol. 118, issue 1383, pp. 983-988 (2010).

Invitation to Pay Additional Fees and Partial International Search Report of PCT Application No. PCT/US2021/013406 dated May 3, 2021: pp. 1-13.

Kyotani et al., "Template synthesis of novel porous carbons using arious types of zeolites," Carbon, vol. 41(7), Jan. 1, 2003: pp. 1451-1459.

* cited by examiner

US 11,208,327 B2

PROCESS FOR THE LARGE-SCALE MANUFACTURE OF ZEOLITE-TEMPLATED CARBON

BACKGROUND OF THE INVENTION

1. Technical Field

The field of invention relates to ordered microporous carbons. More specifically, the field relates to the formation of zeolite-templated carbons and their use in natural gas storage and transportation systems.

2. Description of Related Art

Microporous adsorbents such as activated carbon, metal-organic frameworks, and zeolites are useful in various industrial applications. Among these adsorbents, activated carbons are particularly promising because they typically have a large surface area and high thermal and chemical stability. For example, activated carbons have been reported to have a capacity for adsorbing 130-180 volume by volume methane; making them potentially useful for storing and supplying natural gas for on-demand energy production.

It has been shown that certain limitations of conventional activated carbons, such as low packing density, slow mass transport, and limited material design, can be overcome by synthesizing porous ordered carbons by a templating method with a zeolite template. Microporous ordered carbon manufactured this way is typically referred to as zeolite-templated carbon (ZTC). Conventional synthesis of ZTCs typically requires carbonizing a sacrificial zeolite with an organic compound, such as furfuryl alcohol, in a rotary tubular furnace, plug-flow reactor, or fixed-bed flow reactor. The templated composite is then treated with an acid solution to dissolve the zeolite, leaving behind the ZTC. However, this process results in the destruction of the zeolite template and is only suitable for synthesizing small laboratory scale batches of ZTCs.

SUMMARY OF THE INVENTION

Methods for the large-scale synthesis of a ZTC and the recovery of a zeolite from a dissolved zeolite acid solution byproduct are disclosed.

A method for large-scale synthesis of a ZTC is disclosed. The method includes the steps of: introducing a bed material including a zeolite to a fluidized bed reactor and heating the bed material to a temperature between about 550° C. and about 800° C.; fluidizing the bed material by introducing a fluidizing gas and maintaining the temperature of the bed material between about 550° C. and about 800° C.; introducing an organic carbon precursor while fluidizing the zeolite for a period of time such that carbon is deposited on the zeolite by chemical vapor deposition to produce a zeolite-carbon composite; treating the zeolite-carbon composite with an acid solution such that the zeolite is dissolved and the ZTC is obtained.

In at least one embodiment, at least 100 g of the ZTC is obtained. The fluidizing gas can have an average gas velocity in the fluidized bed reactor that is between 5 centimeters per second (cm/s) and 25 cm/s. In at least one embodiment, the step of fluidizing the bed material includes introducing the fluidizing gas such that the bed material is fluidized in a bubbling fluidization regime. In at least one embodiment, the zeolite can be a bead-type zeolite having a diameter between about 100 micrometers (μm) and about 1,000 μm. In at least one embodiment, the carbon precursor can include a molecule selected from the group consisting of: acetylene, ethylene, ethane, propylene, ethanol, and combinations of the same. In at least one embodiment, the period of time during which the bed material is fluidized with the organic carbon precursor is between about one hour and about six hours. In at least one embodiment, the zeolite has a FAU structure and a ratio of silicon to aluminum that is between 1 and 1.4. In at least one embodiment, the step of treating the zeolite-carbon composite with the acid solution further includes maintaining pH of the acid solution between about 2.5 and about 3.5. At least one embodiment includes filtering the ZTC from the acid solution, and washing and drying the ZTC. In at least one embodiment, the step of drying the ZTC includes heating the ZTC to a temperature between about 80° C. and about 120° C. for a period of time that is between about 1 hour and about 24 hours.

A method for recovering a zeolite from a dissolved zeolite acid solution byproduct is disclosed. The method includes the steps of: synthesizing a zeolite-carbon composite by chemical vapor deposition on the zeolite, the zeolite having a FAU structure and a ratio of silicon to aluminum that is between 1 and 1.4, and the zeolite-carbon composite having a ZTC on the zeolite; dissolving the zeolite with a fluorine-free acid solution to obtain the ZTC and produce the dissolved zeolite acid solution with a base to precipitate an amorphous aluminosilicate; and crystallizing the amorphous aluminosilicate to obtain the zeolite. In at least one embodiment, the method also includes recycling the zeolite for use in synthesizing the ZTC.

In at least one embodiment, the step of synthesizing the zeolite-carbon composite by chemical vapor deposition on the zeolite also includes introducing an organic carbon precursor having a molecule selected from the group consisting of: acetylene, ethylene, ethane, propylene, ethanol, and combinations of the same. In at least one embodiment, the fluorine-free acid solution includes hydrochloric acid. The zeolite can include an NaX zeolite. In at least one embodiment, the step of dissolving the zeolite with the fluorine-free acid solution also includes maintaining pH of the acid solution between about 2.5 and about 3.5. In at least one embodiment, the step of synthesizing the zeolite-carbon composite by chemical vapor deposition on the zeolite is carried out in a fluidized bed reactor. In at least one embodiment, the fluidized bed reactor is operated such that the zeolite is fluidized in a bubbling fluidization regime. In at least one embodiment, at least 100 grams of the ZTC is obtained.

BRIEF DESCRIPTION OF THE DRAWINGS

These and other features, aspects, and advantages of the scope will be better understood with regard to the following descriptions, claims, and accompanying drawings. However, the drawings illustrate only several embodiments and are therefore not to be considered limiting of the scope as it can admit to other effective embodiments.

Figure 1:
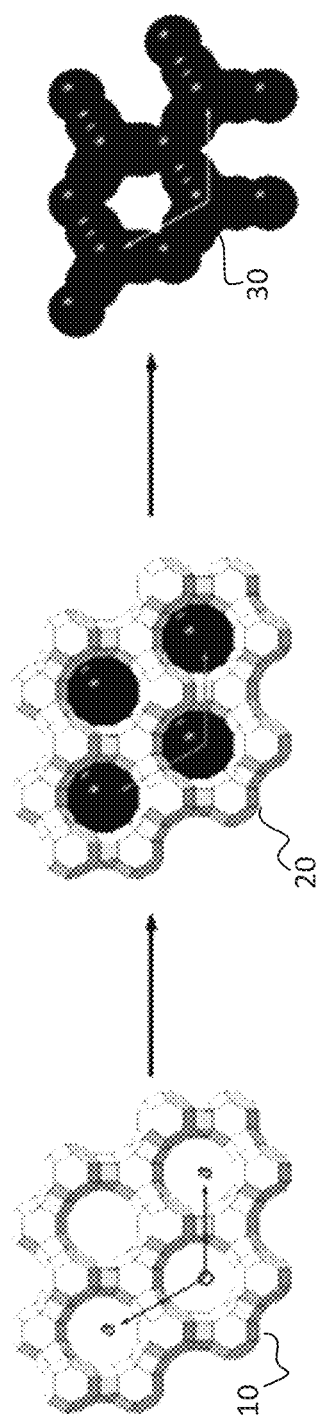
FIG. 1 is an illustration of a process for synthesizing a ZTC with a FAU structured zeolite template.

In the accompanying figures, similar components or features, or both, may have a similar reference label.

DETAILED DESCRIPTION OF THE DRAWINGS

The disclosure describes various embodiments related to processes for the large-scale synthesis of ZTC, and processes for recovering a zeolite from dissolved zeolite acid solutions produced in the process of synthesizing ZTCs.

For certain embodiments, many details are provided for thorough understanding of the various components or steps. In other instances, well-known processes, compositions, and systems are not described in particular detail so that the embodiments are not obscured by detail. Likewise, illustrations of the various embodiments can omit certain features or details so that various embodiments are not obscured. One of ordinary skill in the relevant art will appreciate that many examples, variations, and alterations to the methods described here are within the scope and spirit of the disclosure.

Accordingly, the embodiments described are set forth without any loss of generality, and without imposing limitations on the disclosure. Those of ordinary skill in the relevant art understand that the scope includes all possible combinations and uses of particular features described in the specification.

The description can use the phrases "in some embodiments," "in various embodiments," "in an embodiment," or "in embodiments," which can each refer to one or more of the same or different embodiments. Furthermore, the terms "comprising," "including," "having," and the like, as used with respect to embodiments of the present disclosure, are synonymous.

In this disclosure and the appended claims, unless otherwise indicated, all numbers expressing quantities, percentages or proportions, and other numerical values used in the specification and claims are to be understood as being modified in all instances by the term "about." The term "about" applies to all numeric values, whether or not explicitly indicated. Values modified by the term "about" include at least a deviation of ±5% of the given value unless the deviation changes the nature or effect of the value such that it is not operable to achieve its intended purpose.

Ranges can be express in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit as well as the upper limit and the lower limit and includes smaller ranges of the interval subject to any specific exclusion provided.

Unless otherwise defined, all technical and scientific terms used in this specification and the appended claims have the same meanings as commonly understood by one of ordinary skill in the relevant art.

Where a method comprising two or more steps is recited or referenced in this disclosure or the appended claims, the defined steps can be carried out in any order or simultaneously except where the context excludes that possibility.

As used throughout this disclosure, the term "zeolite-templated carbon" refers to an ordered porous carbon structure that is synthesized by a templating method with a zeolite template.

As used throughout this disclosure, the term "organic carbon precursor" refers to an organic molecule that can be reacted to obtain carbon. Nonlimiting examples of organic carbon precursors can include acetylene, ethane, ethanol, ethylene, furfuryl alcohol, propane, propylene, methane, and combinations of the same.

As used throughout this disclosure, the term "zeolite-carbon composite" refers to a particle having a zeolite template with carbon deposited thereon. In the synthesis of zeolite-templated carbon, a zeolite-carbon composite is the particle that is formed after carbon is deposited on the zeolite template and before the zeolite template is dissolved.

As used throughout this disclosure in the context of ZTC synthesis, the term "large-scale synthesis" refers to the synthesis of at least 100 grams (g) of ZTC.

As used throughout this disclosure, the term "FAU structure" refers to a faujasite zeolite framework as identified and defined by the International Union of Pure and Applied Chemistry at the time of filing this disclosure.

It is contemplated that ZTCs may be useful for storing adsorbed gases in a variety of industrial or commercial processes. For example, ZTCs may be useful for storing adsorbed natural gas in order to allow energy producers to fuel energy production as demand for energy changes. Adsorbed natural gas may also be useful for storing fuel for transportation, heating, or running generators. Zeolite templated carbons can be useful in such applications due to their generally favorable adsorption capacity, packing density, mass transport, stability, and material design characteristics when compared with other microporous adsorbents such as activated carbon.

Zeolite-templated carbon can be prepared by chemical vapor deposition of carbon on a zeolite template. In such methods, a zeolite is used as a sacrificial template and organic molecules such as acetylene, ethane, ethanol, ethylene, propane, propylene, methane, are carbonized inside the pores of the zeolite. FIG. 1 shows an illustration of a zeolite 10 that is used as a sacrificial template, a zeolite-carbon composite 20 showing the carbonized pores of the zeolite, and a ZTC 30 that is obtained after the sacrificial zeolite template has been dissolved.

Conventional methods using plug flow or rotary kiln reactors have been used to synthesize small laboratory scale batches of ZTCs, but the results from such methods are difficult to reproduce at large-scale. This disclosure provides a process for the large-scale synthesis of ZTCs using chemical vapor deposition of an organic carbon precursor on a zeolite in a fluidized bed, where the fluidized bed is fluidized in a bubbling fluidization regime. Advantageously, certain embodiments of the disclosed processes can be carried out in shorter periods of time than conventional ZTC synthesis processes.

Processes for the large-scale synthesis of an ordered microporous carbon can include introducing a zeolite to a fluidized bed reactor. In certain embodiments, the zeolite can have a FAU structure. In at least one embodiment, the zeolite is NaX zeolite and has a ratio of silicon to aluminum that is between 1 and 1.4. The bed material can have particles in any shape that is suitable for fluidization in the fluidized bed reactor. In some embodiments, the bed material includes a bead-type zeolite having a diameter between about 100 micrometers (µm) and 1,000 µm as measured by a straight line between the two most distant points of the bead-type zeolite. In at least one embodiment, the bed material includes a bead-type zeolite having a diameter between about 400 µm and 800 µm. The zeolite is provided in amounts sufficient to produce at least 100 g of ZTC. In at least one embodiment, the mass of ZTC produced is between about 20% and about 40% of the mass of zeolite. In at least one embodiment, the mass of the zeolite used to produce at least 100 g of ZTC is at least about 250 g, preferably at least about 400 g, most preferably at least about 500 g.

The bed material is heated to a suitable temperature that can be selected such that it is sufficient to decompose the organic carbon precursor, but within the limits of thermal stability of the zeolite. Greater temperatures generally reduce the requisite time for carrying out chemical vapor deposition on the zeolite. In at least one embodiment, the bed material is heated to a temperature between about 550° C. and 800° C., for example between about 650° C. and 800° C. To promote even heating, the bed material can be fluidized as it is heated. A person of ordinary skill in the art will appreciate that the zeolite can be preheated before being introduced to the fluidized bed reactor.

Once the bed material is heated to a temperature between about 550° C. and 800° C., the bed material is fluidized with a fluidizing gas. The fluidizing gas can be any relatively inert gas. In some embodiments, the fluidizing gas can be an inert gas such as nitrogen ($N_2$), helium (He), argon (Ar), carbon dioxide ($CO_2$), or a combination of inert gases. Fluidization is dependent on factors such as particle size, particle density, fluid density, and fluidizing gas velocity. With all other factors held constant, fluidized bed material can be classified in various fluidization regimes by the fluidization gas velocity. Generally, as the velocity of the fluidizing gas increases to the point where drag forces from the fluidizing gas are greater than or equal to the force of gravity on the particles, the bed material becomes fluidized. In a fixed bed fluidization regime, the magnitude of drag forces on particles in the bed material from the fluidization gas is less than the magnitude of the force of gravity on the particles. The bed material in a fixed bed fluidization regime is largely static and not fluidized.

In at least one embodiment, the bed material is fluidized in a bubbling fluidization regime while the temperature of the fluidized bed material is maintained between about 550° C. and 800° C. Preferably, the bed material is fluidized with fluidizing gas having a temperature between about 550° C. and 800° C. Fluidized bed material can be characterized as being in a bubbling fluidization regime when the velocity of the fluidizing gas is sufficient to cause pockets of fluidizing gas, or bubbles, to form in the bed material. Bubbles generally increase in size as the velocity of the fluidizing gas increases. Bubbles can promote mixing, which contributes to even temperature distribution and chemical vapor deposition. In some embodiments, the fluidizing gas can have a velocity that is between about 5 cm/s and 25 cm/s, preferably between about 8 cm/s and about 18 cm/s.

Chemical vapor deposition with an organic carbon precursor is carried out after the bed material is fluidized, and is carried out for a period of time to deposit carbon the zeolite and produce a zeolite-carbon composite. The organic carbon precursor can be selected based on its tendency to decompose at the temperature of the fluidized bed material and fill the pores of the zeolite. By way of example and not limitation, it has been found that propylene is a suitable organic carbon precursor for a bed material having NaX zeolite because as propylene decomposes and fills the pores of the zeolite at temperatures around 700° C., NaX zeolite remains thermally stable up to temperatures of about 800° C. In contrast, ethylene is unsuitable for use as an organic carbon precursor with NaX zeolite because it is slow to deposit on the zeolite even at 800° C., at which point the NaX zeolite becomes thermally unstable. It is contemplated that ethylene may be a suitable carbon precursor in embodiments where the zeolite is not recycled and a zeolite other than NaX zeolite is used. In some embodiments, the period of time allowed for chemical vapor deposition can be between about 2 hours and 36 hours.

After chemical vapor deposition is carried out for a period of time, carbon deposits on the zeolite can be densified by heat-treating the zeolite-carbon composite. Heat treatment may be desirable in embodiments where chemical vapor deposition is carried out at a temperature less than about 800° C. to improve ZTC quality, but is not required. The heat treatment can include heating the zeolite-carbon composite to a temperature of about 800° C. for a period of time. By way of example and not limitation, a heat treatment can be carried out in the fluidized bed reactor by heating the fluidizing gas to about 800° C., and introducing the heated fluidizing gas to the bed material with a velocity that is sufficient to transfer heat from the fluidizing gas to the zeolite-carbon composite but insufficient to fluidize the bed material.

The zeolite-carbon composite is treated with an acid solution to remove the zeolite and produce the ZTC and an acid solution byproduct having the dissolved zeolite. The acid solution can be any aqueous solution capable of chemically etching the zeolite. In at least one embodiment, the acid solution includes hydrochloric acid (HCl) and hydrofluoric acid (HF). In at least one embodiment, the acid solution includes an acid selected from hydrochloric acid, sulfuric acid, phosphoric acid, and combinations of the same. In at least one embodiment, the acid solution is substantially free (that is, about 0 ppmw) of fluorine. The resulting ZTC can then be filtered, washed, and dried. In at least one embodiment, the ZTC is dried by heating the ZTC to a temperature between 80° C. and 120° C. for a period of time, such as between about 1 hour and 24 hours.

Conventionally, the acid solution byproduct containing the dissolved zeolite is discarded; which presents significant environmental and economic problems due to the presence of corrosive and toxic wastes in the acid solution. Not intending to be bound by theory, it is believed that fluorine in conventional acid solutions reacts with silicon dioxide ($SiO_2$) to produce silicon hexafluoride ion ($SiF_6^{2-}$), thus peptizing silicate oligomers or polymers into smaller fragments which are able to pass through micropores of the ZTC. But the silicon hexafluoride ion is toxic and not a suitable inorganic precursor for resynthesizing the zeolite.

It has been found that dissolved NaX zeolite can be recovered from an acid solution byproduct and recrystallized for reuse by using an acid solution that includes a mineral acid and is substantially free of fluorine. Aluminum in zeolites can be dissolved by mineral acids such as hydrochloric acid in the absence of fluorine. By way of example and not limitation, examples of suitable mineral acids include hydrochloric acid, sulfuric acid, nitric acid, phosphoric acid, and combinations of the same. Suitable zeolites are those having a FAU structure and silicon and aluminum in a molar ratio that is between about 1 and 1.4. NaX zeolite, which has a molar ratio of silicon to aluminum that is 1.27, is particularly suitable. When the zeolite is treated with a mineral acid, the framework leaching of aluminum directly generates monomeric silicate species (such as silica acid). Polymerization of the silicate species can be inhibited by choosing suitable pH conditions, and the NaX zeolite can be removed from the zeolite-carbon composite without fluorine. In at least one embodiment, polymerization of the silicate species is inhibited by maintaining the pH of the acid solution in the range of about 2.5-3.5.

Most of the dissolved aluminum and silicon species in the acid solution can be recovered as amorphous aluminosilicate precipitates by neutralizing the acid with a base. By way of example and not limitation, the acid solution can be neutralized by titrating with sodium hydroxide. The amorphous aluminosilicate precipitates can be filtered and washed with water. The washed amorphous aluminosilicate can then be dried. In at least one embodiment, the amorphous aluminosilicate precipitates are dried at a temperature of about 100° C. The supernatant can include dissolved salts that are nontoxic and noncorrosive, such as sodium chloride (NaCl).

The amorphous aluminosilicate can be recrystallized by preparing a water suspension with the amorphous aluminosilicate and sodium hydroxide, with sufficient sodium hydroxide to produce a gel composition. In at least one embodiment, the molar amount of sodium hydroxide used to prepare the water suspension with the amorphous aluminosilicate is about the same as the amount of sodium hydroxide used to precipitate the aluminosilicate from the acid solution. The gel composition is then aged for a period of time. Aging can be carried out by stirring the gel composition at room temperature for a period of time between about 48 hours and about 72 hours. In at least one embodiment, the gel composition has a composition of 2.8 $SiO_2$: 1.0 $Al_2O_3$: 4.2 $Na_2O$: 147 $H_2O$, and is aged by stirring at room temperature for about one day. The aged gel composition is then hydrothermally treated at a temperature between about 100° C. and about 120° C. for a period of time to obtain solid recrystallized zeolite. In at least one embodiment, the aged gel composition is hydrothermally treated at a temperature of about 100° C. for about 48 hours without mixing. The solid recrystallized zeolite can then be filtered, washed with water, and dried. In at least one embodiment, the solid recrystallized zeolite is filtered, washed with deionized water, and dried at a temperature of about 100° C. for a period of about 24 hours. The solid recrystallized zeolite is suitable for reuse as a template for the large-scale synthesis of ZTC.

Figure 2:
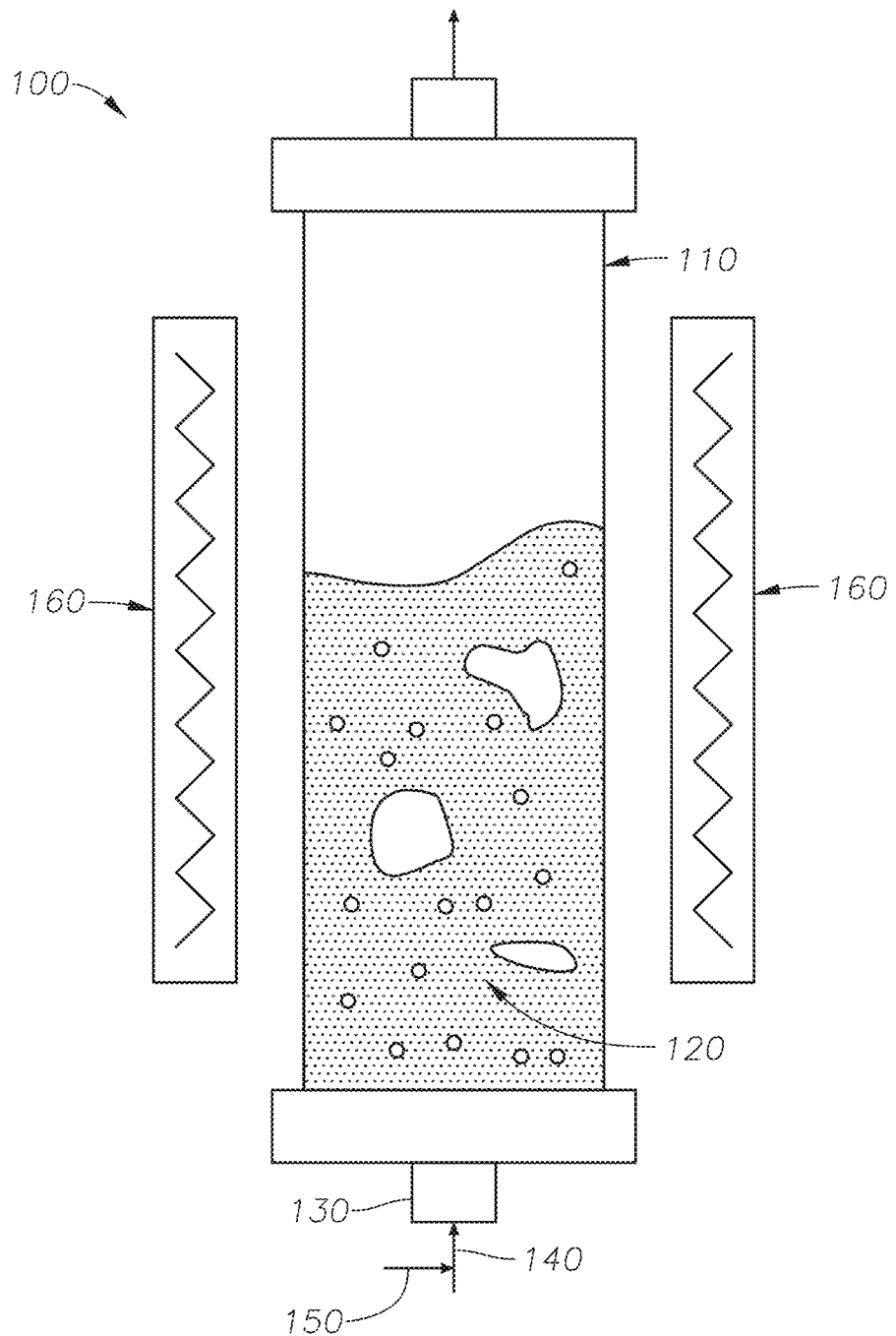
FIG. 2 is an illustration of a fluidized bed reactor having a zeolite bed fluidized in a bubbling fluidization regime.

An example of a fluidized bed reactor is shown in FIG. 2. Generally, the fluidized bed reactor 100 includes a vertical column 110; typically a cylinder, though the shape is not particularly limited and a person of ordinary skill in the art would conceive of other suitable shapes. Bed material 120 having the zeolite is provided in the vertical column 110. The fluidized bed reactor can also have a heat source 160. A fluidizing gas is provided to fluidizing gas inlet 130 by fluidizing gas stream 140 to fluidize the bed material 120. A plenum chamber (not shown) can be provided in the fluidized bed reactor 100 to distribute the fluidizing gas as it enters the reactor. An organic carbon precursor stream 150 can deliver the organic carbon precursor to the fluidizing gas inlet 130 where it can be mixed with the fluidizing gas. The organic carbon precursor can be mixed or combined with the fluidizing gas in fluidizing gas stream 140 before being introduced to the fluidized bed reactor 100, or both can be introduced independently to the fluidized bed reactor 100.

EXAMPLES

The following examples are included to demonstrate embodiments of the disclosure, and should be considered nonlimiting. The techniques and compositions disclosed in the examples which follow represent techniques and compositions discovered to be suitable in the practice of the disclosure, and thus can be considered to constitute modes for its practice. However, changes can be made to the embodiments disclosed in the examples without departing from the spirit and scope of the disclosure.

1. Synthesis of ZTCs Using a Bubbling Fluidized Bed.

Figure 3:
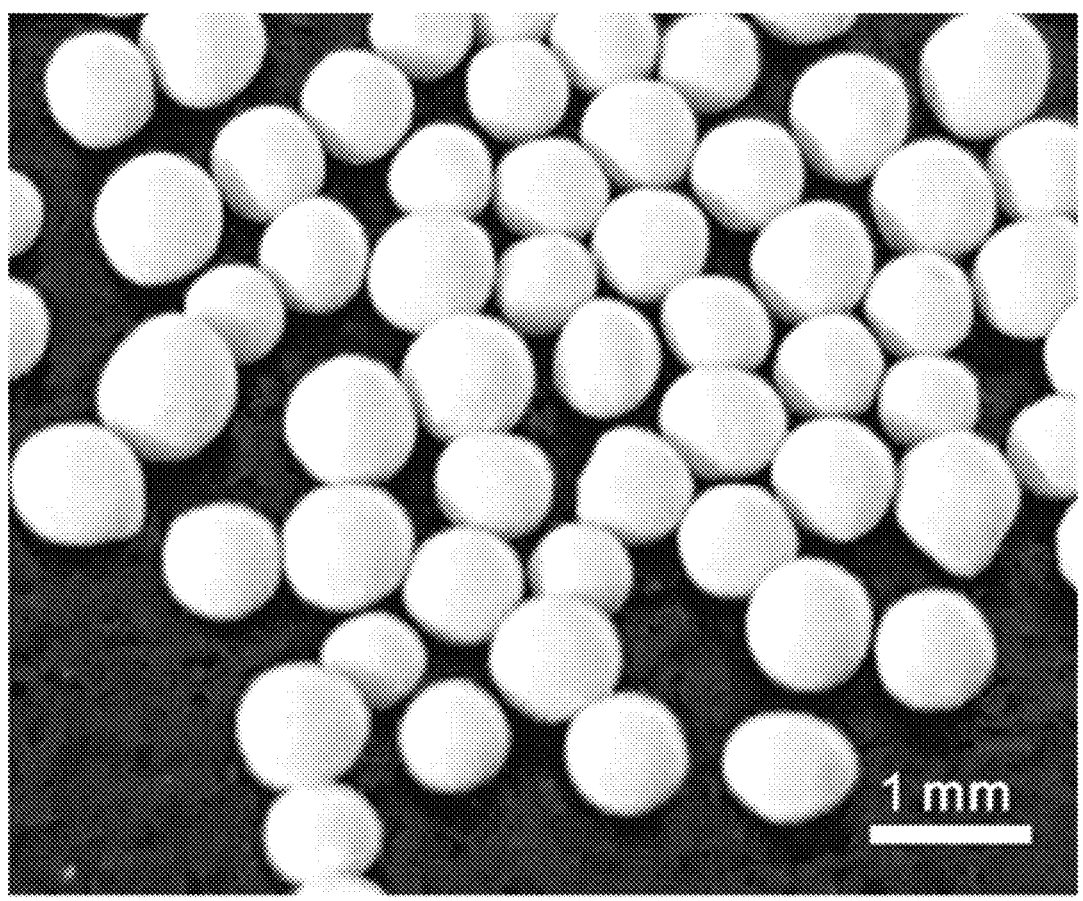
FIG. 3 is an image of bead-type zeolite.

A nonlimiting example of a bubbling fluidized bed for the synthesis of ZTC is provided. A bed material having about 100 g of a bead-type NaX zeolite with a diameter between about 400 μm and 800 μm was introduced to a fluidized bed reactor having an inner diameter of 70 millimeters (mm). The zeolite has a Brunauer-Emmett-Teller (BET) surface area ($S_{BET}$) of 754 square meters per gram ($m^2/g$), micropore volume ($V_{micro}$) of 0.31 cubic centimeters per gram ($cm^3/g$), mesopore volume ($V_{meso}$) of 0.06 $cm^3/g$, and total pore volume ($V_{total}$) of 0.37 $cm^3/g$. FIG. 3 shows an image of the bead-type zeolite.

A hot fluidizing gas including nitrogen ($N_2$) was introduced at a rate of about 2 liters per minute (L/min) to heat the zeolite to a temperature between about 700° C. and 800° C. The flow of the fluidizing gas was increased to about 20 L/min fluidize the bed material in a bubbling fluidization regime, and the temperature was stabilized for about 30 minutes. Propylene was then was then injected into the fluidizing gas stream as an organic carbon precursor at rate of about 0.5 L/min, and carbon deposition on the zeolite by chemical vapor deposition was carried out for a period of time to obtain a zeolite-carbon composite.

Figure 4:
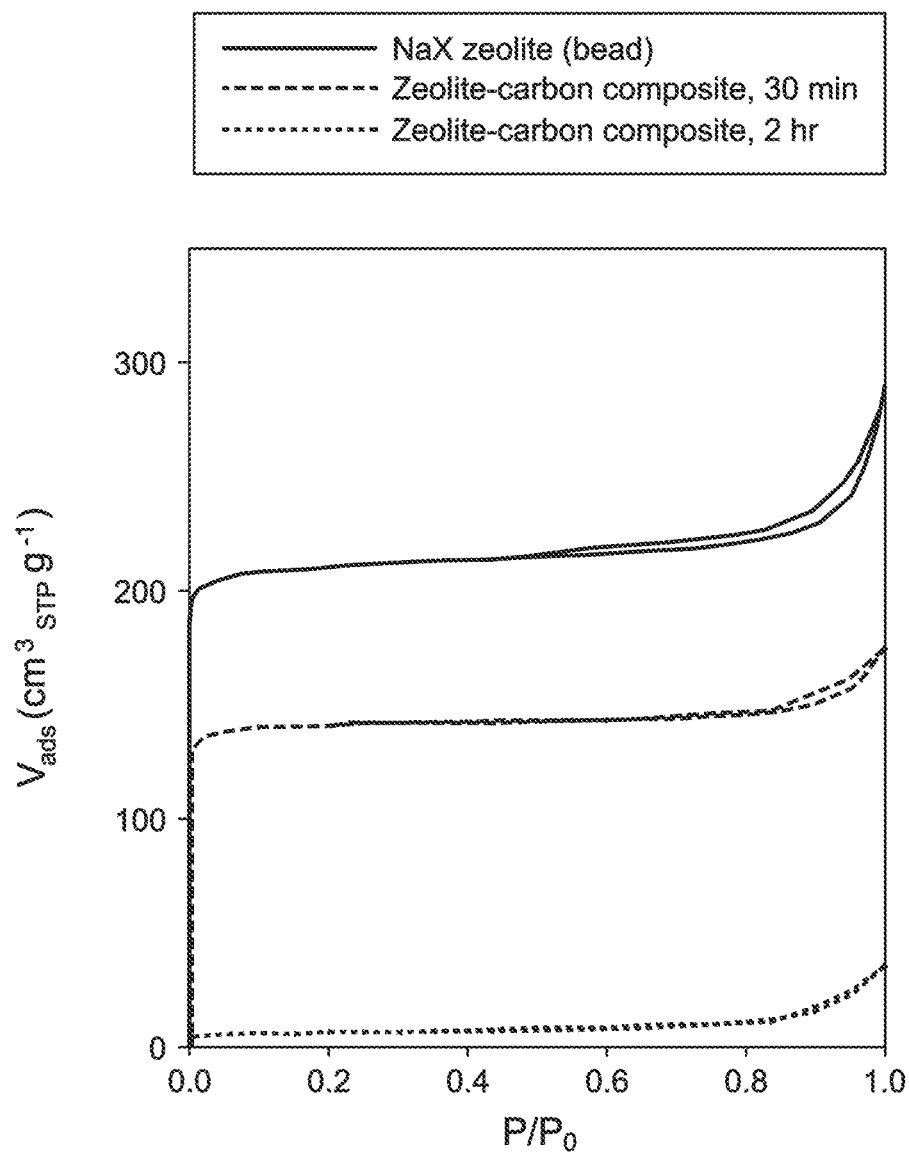
FIG. 4 shows a comparison of nitrogen adsorption-desorption isotherms for a zeolite-carbon composite formed by chemical vapor deposition with propylene after 30 minutes and 2 hours, with a NaX zeolite.

After carrying out the chemical vapor deposition on the zeolite, the zeolite-carbon composite was heat treated by heating the zeolite-carbon composite to a temperature of about 800° C. for a period of about 3 hours to densify the carbon framework on the zeolite. FIG. 4 shows a nitrogen adsorption and desorption isotherm comparison of the zeolite with the zeolite-carbon composite after 30 minutes of chemical vapor deposition, and with the zeolite-carbon composite after 2 hours of chemical vapor deposition. As seen in FIG. 4, the amount of nitrogen that is adsorbed on the zeolite-carbon composite decreases as chemical vapor deposition is carried out. The data suggests that the pores of the zeolite are mostly filled after about 2 hours of chemical vapor deposition.

Figure 5:
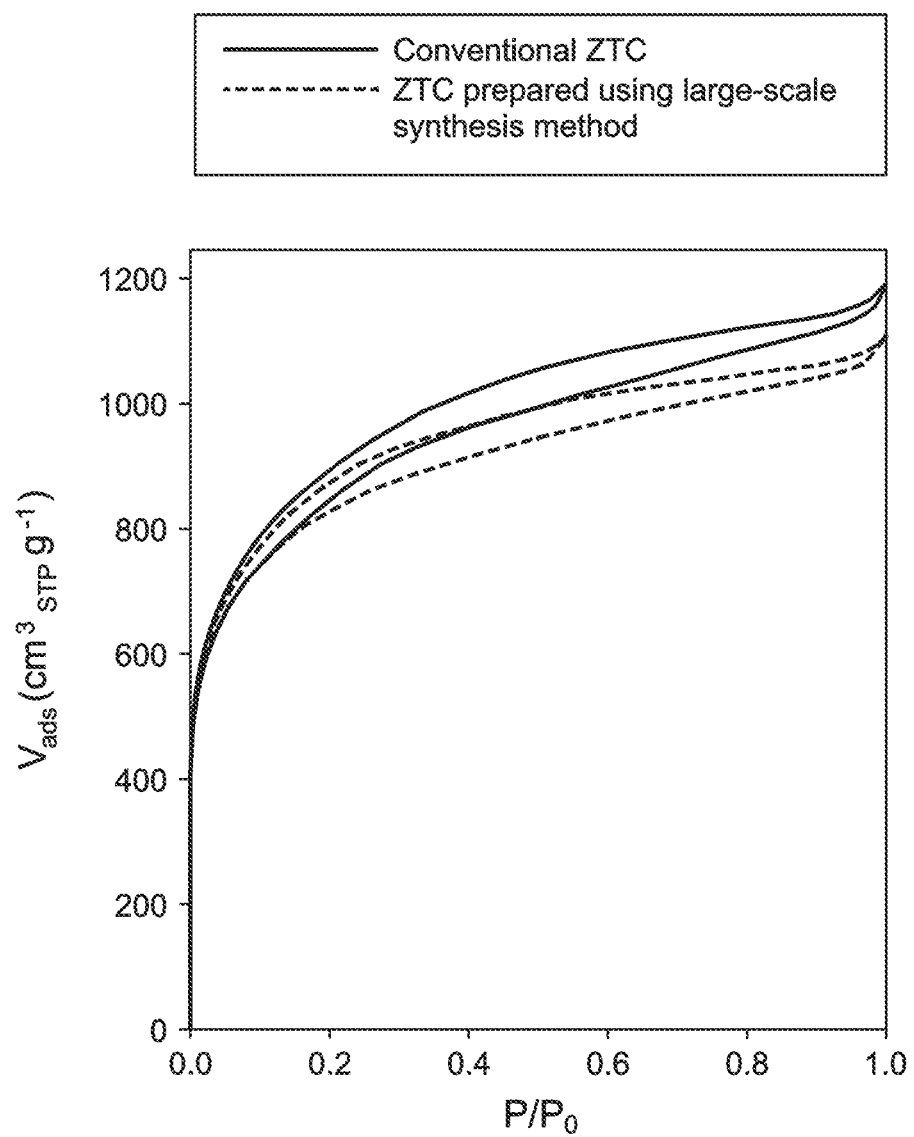
FIG. 5 shows a comparison of nitrogen adsorption-desorption isotherms for ZTC samples synthesized by chemical vapor deposition with propylene at different temperatures.

The zeolite-carbon composite obtained after 2 hours of chemical vapor deposition was treated with an acid solution having molar concentration (M) of 0.2 M hydrochloric acid and 0.48 M hydrofluoric acid to remove the zeolite and obtain the ZTC. The ZTC was filtered, washed with deionized water, and dried overnight at a temperature of about 100° C. FIG. 5 shows a nitrogen adsorption-desorption isotherm comparison of the ZTC compared with a conventional ZTC prepared using chemical vapor deposition methods with propylene in a plug-flow (rotary kiln) reactor at a temperature of about 600° C. for a period of about 20 hours. As seen in FIG. 5, the ZTC produced by the disclosed large-scale synthesis method has similar adsorption-desorption properties as the conventional ZTC.

Table 1 shows the structural properties of the ZTC prepared using the disclosed large-scale synthesis method, and the conventional ZTC. In Table 1, the ZTC prepared in this example using the disclosed large-scale synthesis method is referred to as "large-scale ZTC." The micropore volume shown in Table 1 was calculated using the Dubinin-Radushkevich (DR) equation.

TABLE 1

Structural properties of large-scale ZTC and conventional ZTC.

| ZTC Sample | $S_{BET}$ (m$^2$/g) | $V_{micro}$ (cm$^3$/g) | $V_{meso}$ (cm$^3$/g) | $V_{total}$ (cm$^3$/g) |
|---|---|---|---|---|
| Conventional ZTC | 3112 | 1.15 | 0.5 | 1.65 |
| Large-scale ZTC | 3125 | 1.15 | 0.6 | 1.75 |

As shown in Table 1, the ZTC prepared in this example using the disclosed large-scale synthesis method has similar structural properties as the conventional ZTC.

2. Chemical Vapor Deposition Conditions Using Propylene as Organic Carbon Precursors.

Three samples of five grams of NaX zeolite were introduced separately to plug flow reactors having an inner diameter of 45 mm. The NaX zeolite samples were heated to temperatures of 550° C., 600° C., and 650° C. with hot helium. After the temperatures stabilized over a period of about 30 minutes, chemical vapor deposition was carried out for a predetermined periods of time with a mixture of 5 vol % propylene and 95 vol % helium and a flow rate of 0.2 L/min to obtain zeolite-carbon composites. The samples were heat treated by heating the zeolite-carbon composites to a temperature of about 800° C. for a period of about 3 hours to densify the carbon framework within the zeolite micropores. After the heat treatment, the zeolite-carbon composites were cooled and analyzed.

Figure 6A:
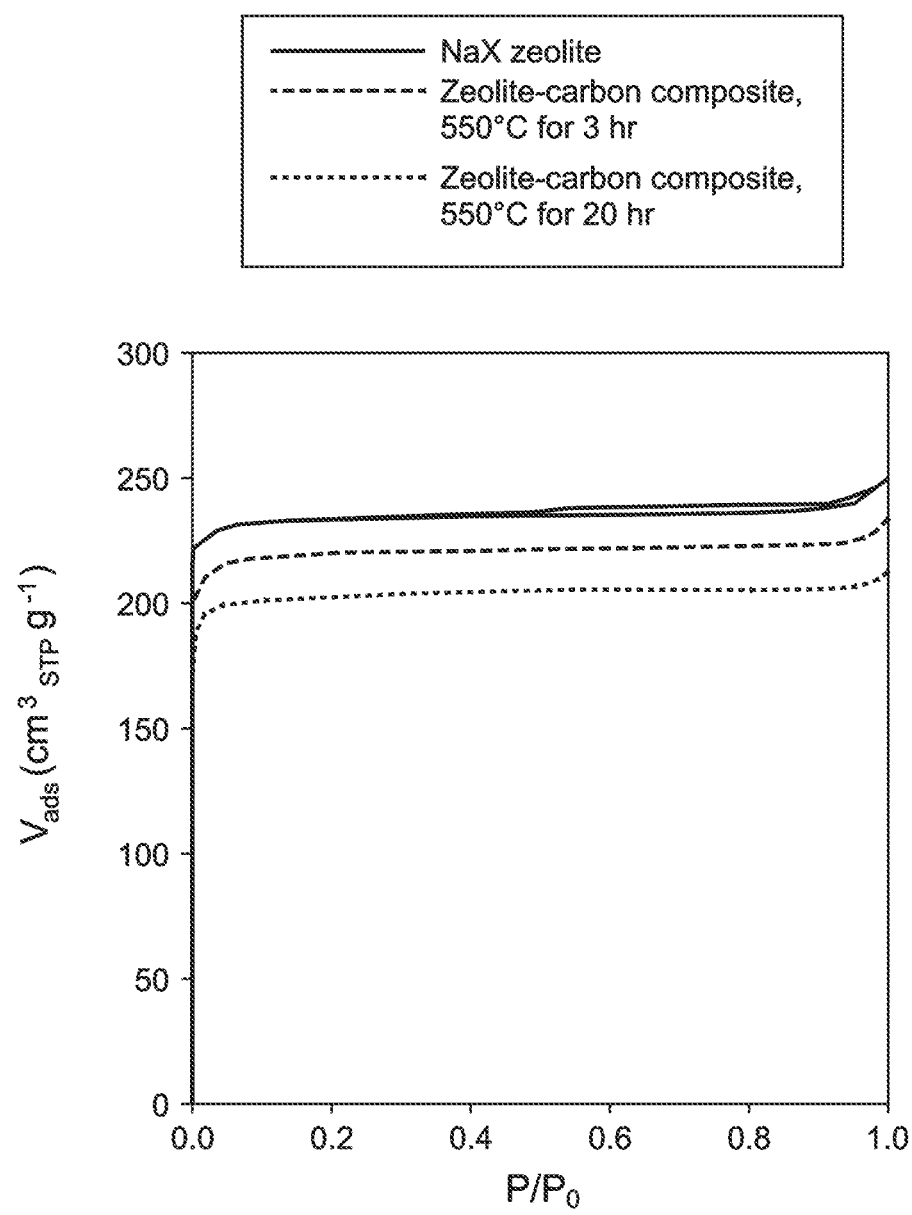
FIG. 6A shows a comparison of nitrogen adsorption-desorption isotherms for zeolite-carbon composite samples prepared by chemical vapor deposition with propylene at 550° C.
Figure 6B:
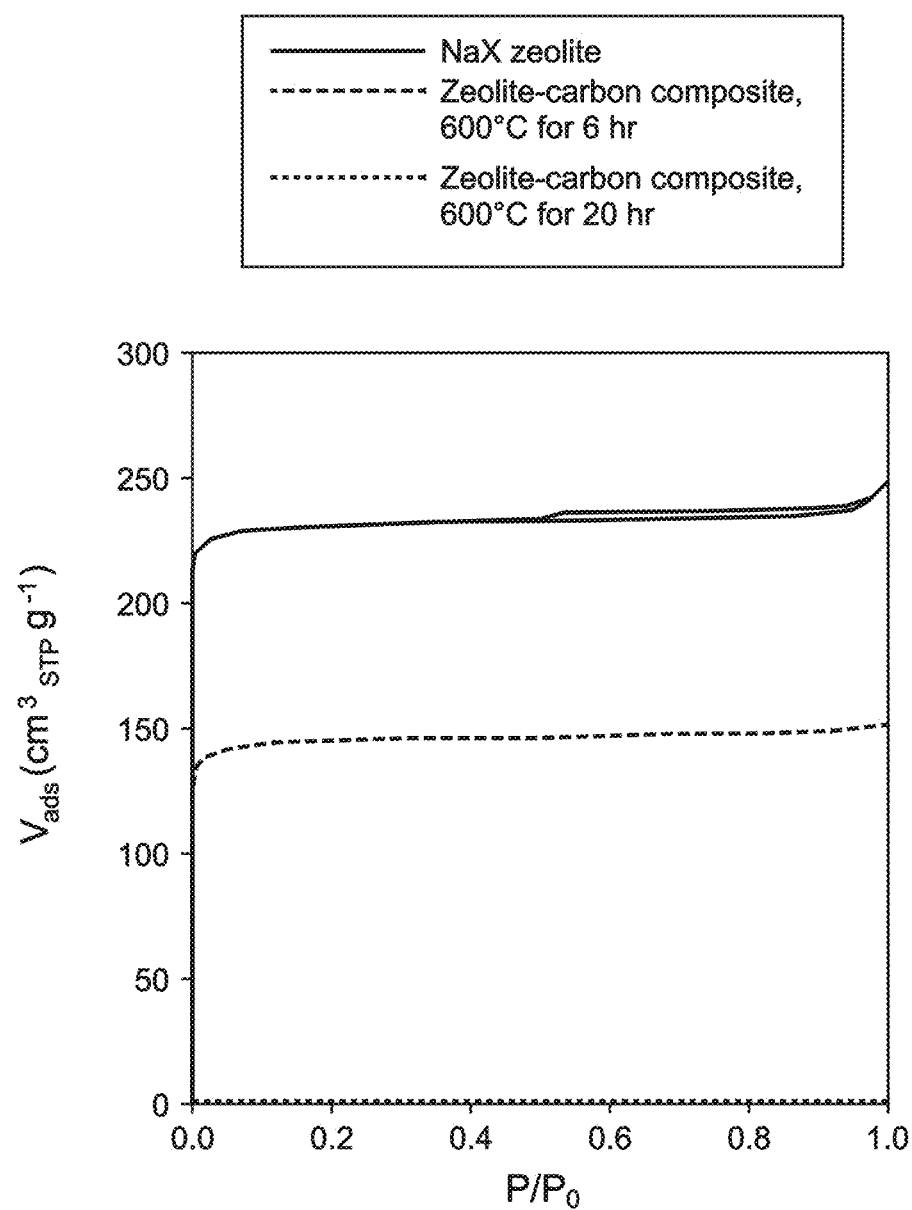
FIG. 6B shows a comparison of nitrogen adsorption-desorption isotherms for zeolite-carbon composite samples prepared by chemical vapor deposition with propylene at 600° C.
Figure 6C:
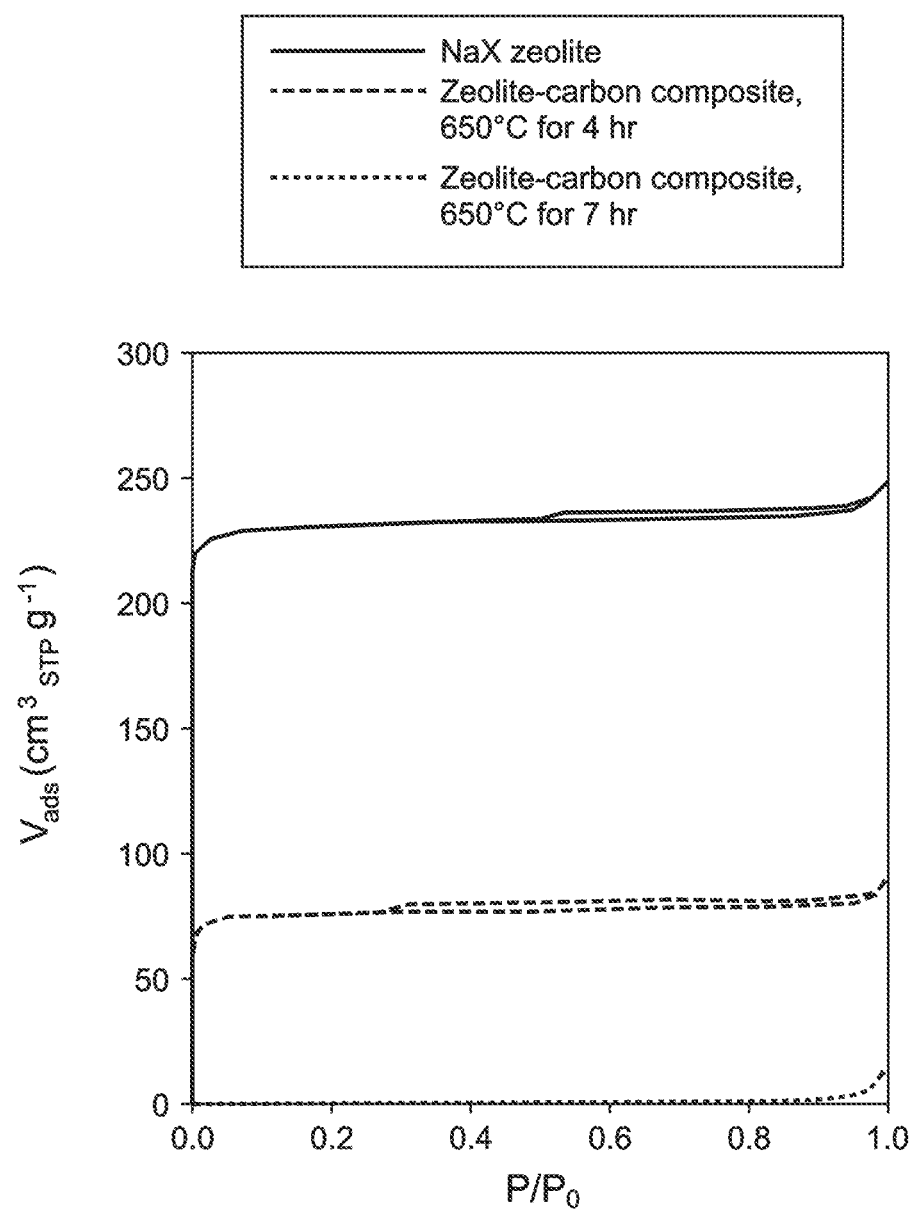
FIG. 6C shows a comparison of nitrogen adsorption-desorption isotherms for zeolite-carbon composite samples prepared by chemical vapor deposition with propylene at 650° C.

FIG. 6 shows nitrogen adsorption-desorption isotherm comparisons of the three samples prepared with chemical vapor deposition at 550° C., 600° C., and 650° C. FIG. 6(a) shows a comparison of the sample prepared with a temperature of 550° C. after 3 hours of chemical vapor deposition and 20 hours of chemical vapor deposition, with the NaX zeolite. FIG. 6(b) shows a comparison of the sample prepared with a temperature of 600° C. after 6 hours and 20 hours, with the NaX zeolite. FIG. 6(c) shows a comparison of the sample prepared with a temperature of 650° C. after 4 hours and 7 hours, with the NaX zeolite.

The results show that chemical vapor deposition carried out at a greater temperature requires a shorter period of time than chemical vapor deposition carried out at a lower temperature. The results also show that the pores of the NaX zeolite could be substantially filled after 7 hours and 20 hours of chemical vapor deposition with propylene at temperatures of 600° C. and 650° C. respectively. These results suggest that a temperature range of 600-650° C. is suitable to selectively fill the zeolite pores with carbon.

Figure 7:
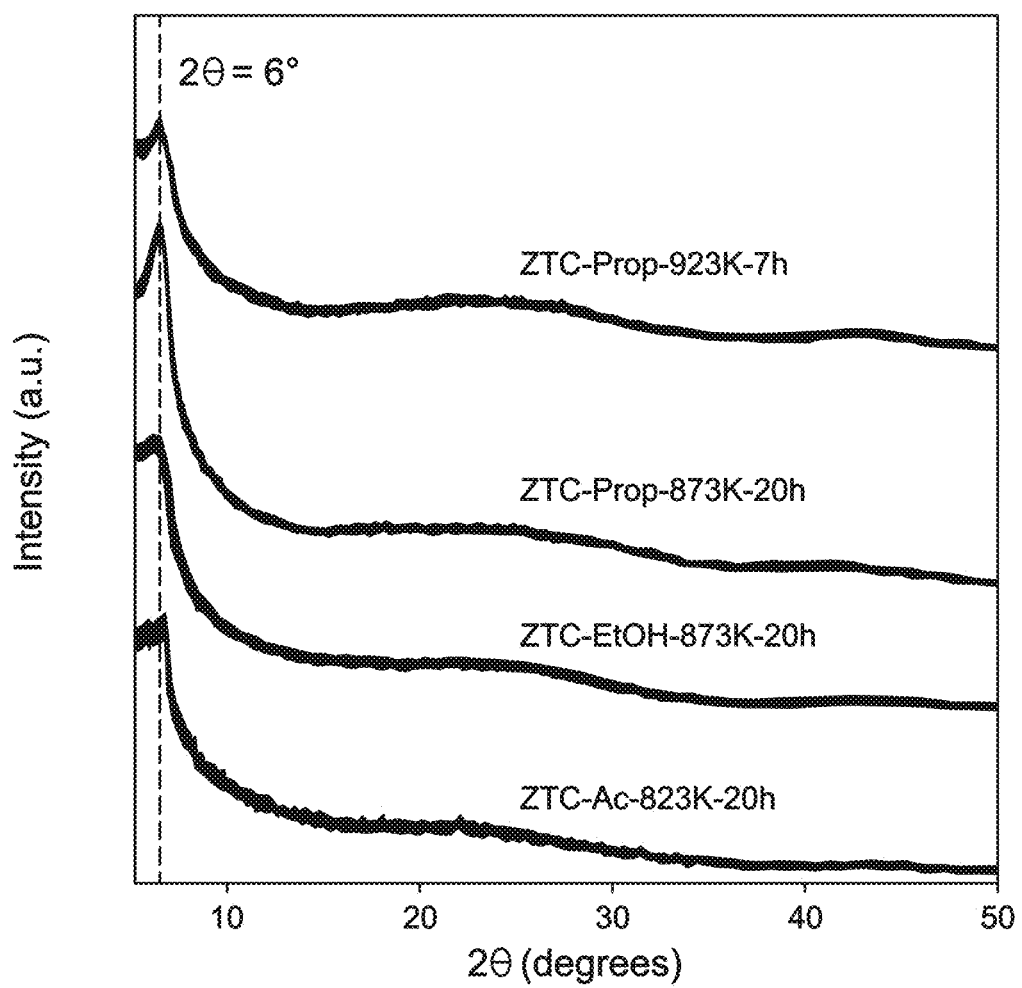
FIG. 7 shows x-ray diffraction patterns for ZTC samples prepared by chemical vapor deposition with propylene, ethanol, and acetylene.

The filled zeolite-carbon composites produced by chemical vapor deposition at 600° C. and 650° C. were treated with an acid solution having hydrochloric and hydrofluoric acid to remove the zeolite and obtain ZTCs, and were analyzed by x-ray diffraction (XRD) analysis. FIG. 7 shows the XRD data from these samples; and for comparison, XRD data for ZTCs prepared by chemical vapor deposition with ethanol and acetelyne is included. In FIG. 7, FIG. 8, and Table 2, ZTC samples are labeled with the following convention: [organic carbon precursor abbreviation]-[temperature]-[time for chemical vapor deposition]; where propylene is abbreviated as "Prop," ethanol is abbreviated as "EtOH," and acetylene is abbreviated as "Ac."

FIG. 7 shows that the ZTC prepared with propylene at 600° C. for a period of 20 hours had the sharpest XRD peak where the 2-theta angle is 6 degrees. These results suggest that the ZTC prepared with propylene at 600° C. for a period of 20 hours had the highest structural order.

Figure 8B:
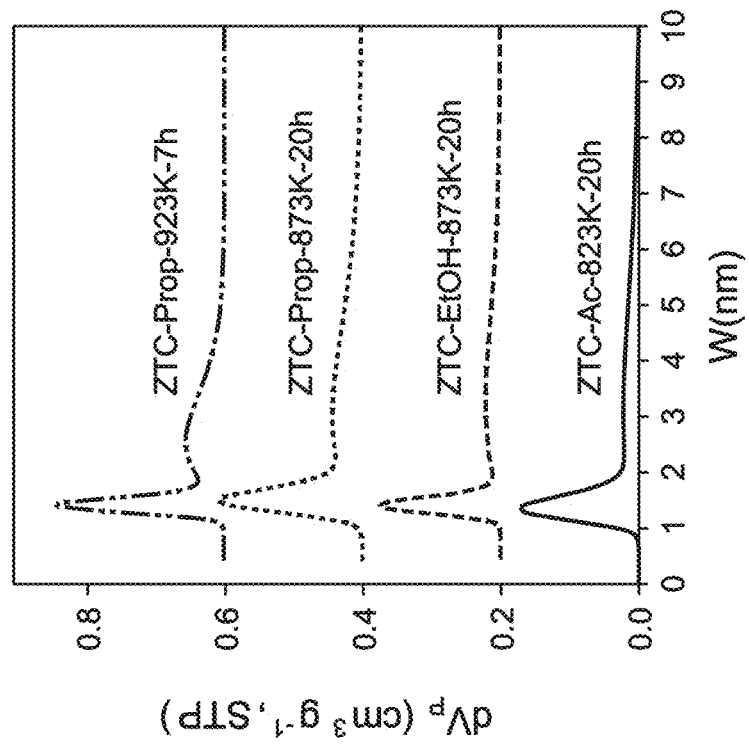
FIG. 8B shows a comparison of pore size distributions of ZTC samples prepared by chemical vapor deposition with propylene, ethanol, and acetylene.
Figure 8A:
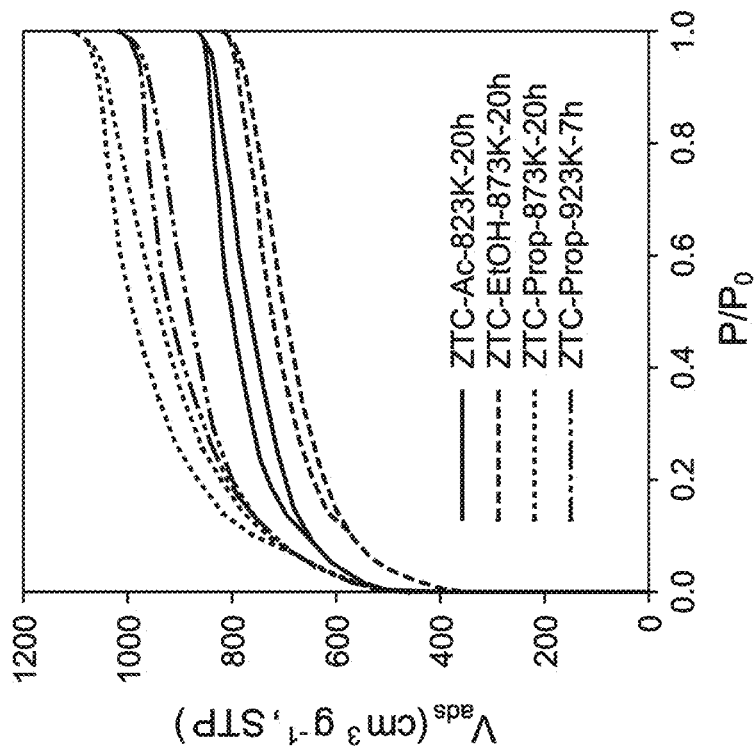
FIG. 8A shows a comparison of nitrogen adsorption-desorption isotherms from the ZTC samples prepared by chemical vapor deposition with propylene, ethanol, and acetylene.

FIG. 8 shows a comparison of nitrogen adsorption-desorption isotherms from the ZTCs of FIG. 7, and their corresponding pore-size distributions. FIG. 8A shows the nitrogen adsorption-desorption isotherm comparison, and FIG. 8B shows the corresponding pore-size distributions. Other structural properties of the ZTCs are summarized in Table 2.

TABLE 2

Structural properties of ZTCs prepared by chemical vapor deposition of propylene at 600° C. for 20 hours and 650° C. for 7 hours, ethanol at 600° C. for 20 hours, and acetylene at 550° C. for 20 hours.

| ZTC Sample | $S_{BET}$ (m$^2$/g) | $V_{micro}$ (cm$^3$/g) | $V_{meso}$ (cm$^3$/g) | $V_{total}$ (cm$^3$/g) |
|---|---|---|---|---|
| Ac-550° C.-20 h | 2577 | 1.03 | 0.26 | 1.29 |
| EtOH-600° C.-20 h | 2327 | 0.92 | 0.30 | 1.22 |
| Prop-600° C.-20 h | 3112 | 1.15 | 0.50 | 1.65 |
| Prop-650° C.-7 h | 3016 | 1.09 | 0.41 | 1.50 |

The results show that ZTCs synthesized using chemical vapor deposition with propylene have significantly greater surface area and micropore volume than ZTCs synthesized using other carbon precursors. The ZTC synthesized by chemical vapor deposition of propylene at 600° C. was of greater quality than the other ZTCs in terms of adsorption-desorption performance, pore-size distribution, surface area, and pore volume.

3. Recovery and Recrystallization of Dissolved NaX Zeolite from an Acid Solution Byproduct.

Zeolite-carbon composites were synthesized by chemical vapor deposition with an organic carbon precursor using as a template a NaX zeolite with a silicon-to-aluminum ratio of 1.27. The zeolite-carbon composites were treated with an acid solution having 0.5 M hydrochloric acid and no fluorine to remove the zeolite and obtain a ZTC and an acid solution byproduct having dissolved zeolite. The NaX zeolite was sufficiently dissolved to remove the zeolite from the zeolite-carbon composite, and the ZTC had nearly identical adsorption-desorption properties as a ZTC obtained by dissolving the zeolite with a mixture of hydrochloric and hydrofluoric acid.

The acid solution byproduct having the dissolved zeolite was titrated with a solution having 1.0 M sodium hydroxide to precipitate aluminosilicates. The supernatant solution primarily contained water and sodium chloride, and did not require special disposal. The aluminosilicates were filtered, washed with water, and dried at 100° C. for a period of time, and then analyzed using XRD analysis. The XRD results are shown in FIG. 9.

Figure 9:
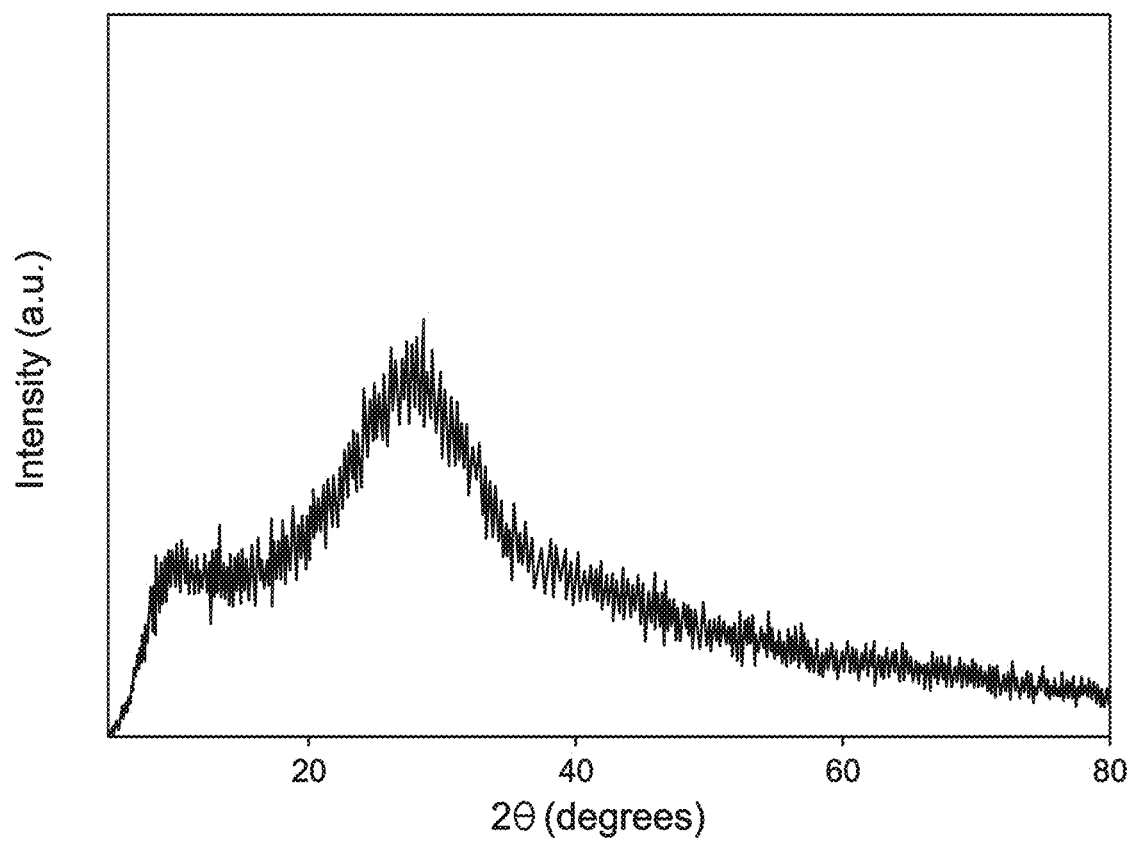
FIG. 9 shows the x-ray diffraction pattern of an aluminosilicate precipitate obtained from an acid solution produced in the process of synthesizing ZTCs.

The XRD data shown in FIG. 9 did not show a discernible peak, indicating that the aluminosilicate precipitate is an amorphous aluminosilicate. Analysis of the silicon, sodium, and aluminum content of the aluminosilicate showed that the aluminosilicate had a similar silicon-to-aluminum ratio as a conventional NaX zeolite (that is, 1.40 and 1.27 respectively); and the sodium-to-aluminum ratios (that is, 1.02 and 1.00) were likewise similar. These results suggest that the inorganic species originally present in the NaX zeolite could be almost fully recovered.

Figure 10:
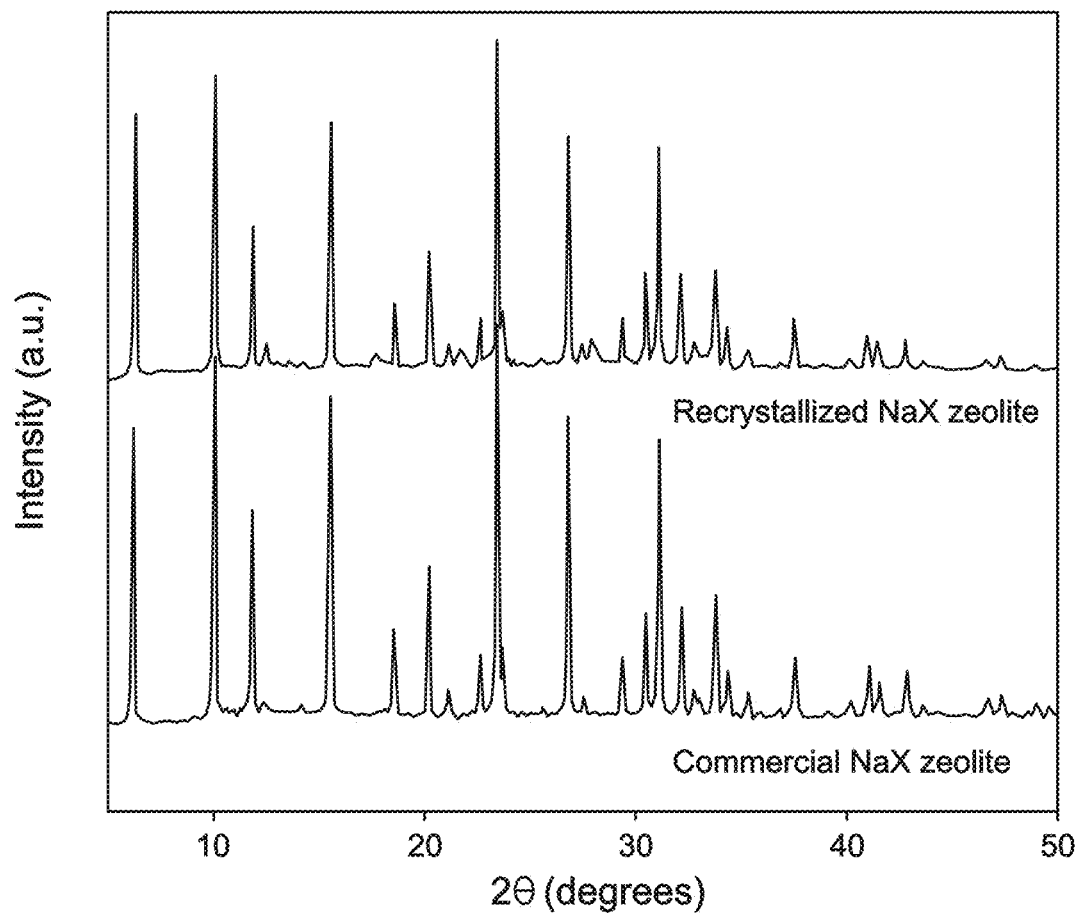
FIG. 10 shows x-ray diffraction patterns of commercial zeolite and recrystallized NaX zeolite obtained from an acid solution produced in the process of synthesizing ZTCs.

The NaX zeolite was recrystallized from the amorphous aluminosilicate by adding sodium hydroxide to a water suspension of the amorphous aluminosilicate to obtain a gel composition of 2.8 $SiO_2$: 1.0 $Al_2O_3$: 4.2 $Na_2O$: 147 $H_2O$. The gel composition was aged by stirring at room temperature for about 1 day, and then hydrothermally treated at about 100° C. for 48 hours under static conditions to obtain recrystallized NaX zeolite. The recrystallized NaX zeolite was filtered, washed with deionized water, and dried at a temperature of about 100° C. for about 1 day. The recrystallized NaX zeolite was analyzed using XRD, and the results are shown in FIG. 10 along with XRD analysis data from commercial NaX zeolite. FIG. 10 shows that the XRD pattern of the recrystallized NaX zeolite was very similar to the XRD pattern of the commercial NaX zeolite.

Figure 11:
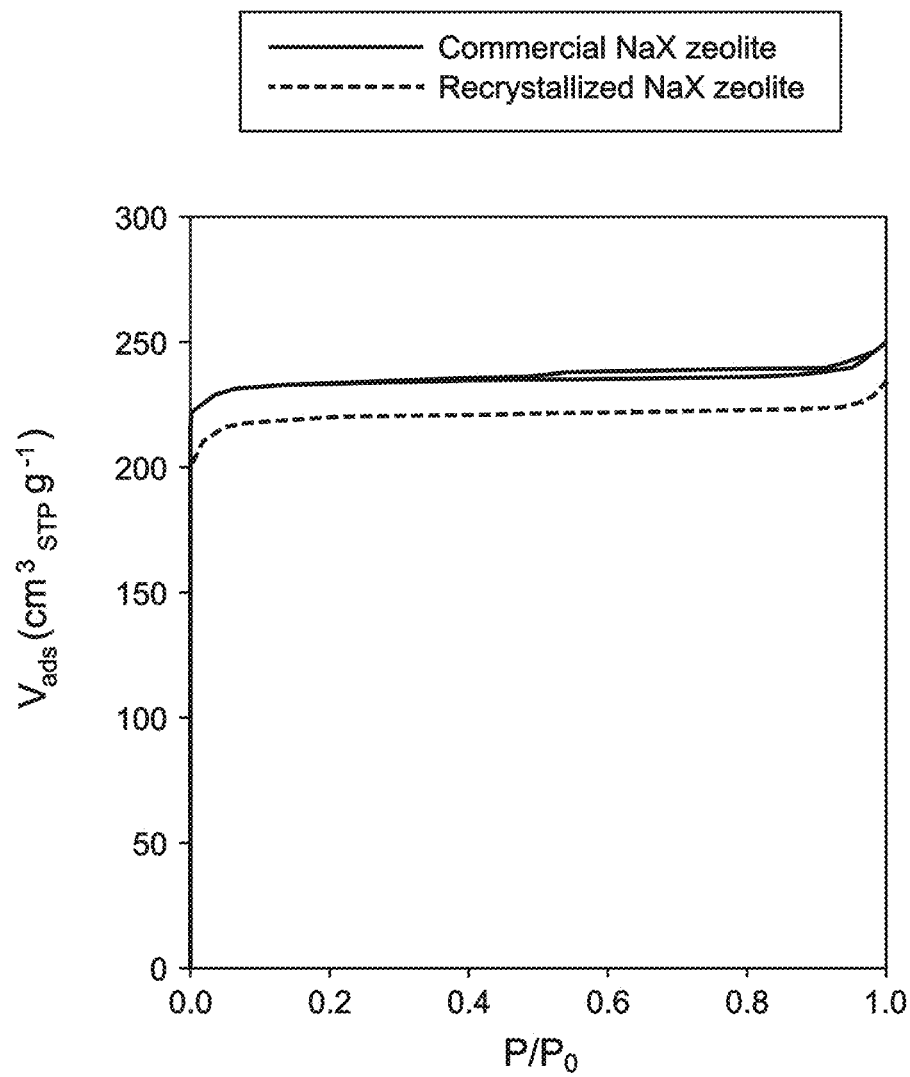
FIG. 11 shows a comparison of nitrogen adsorption-desorption isotherms for commercial NaX zeolite with recrystallized NaX zeolite obtained form an acid solution produced in the process of synthesizing ZTCs.
Figure 12:
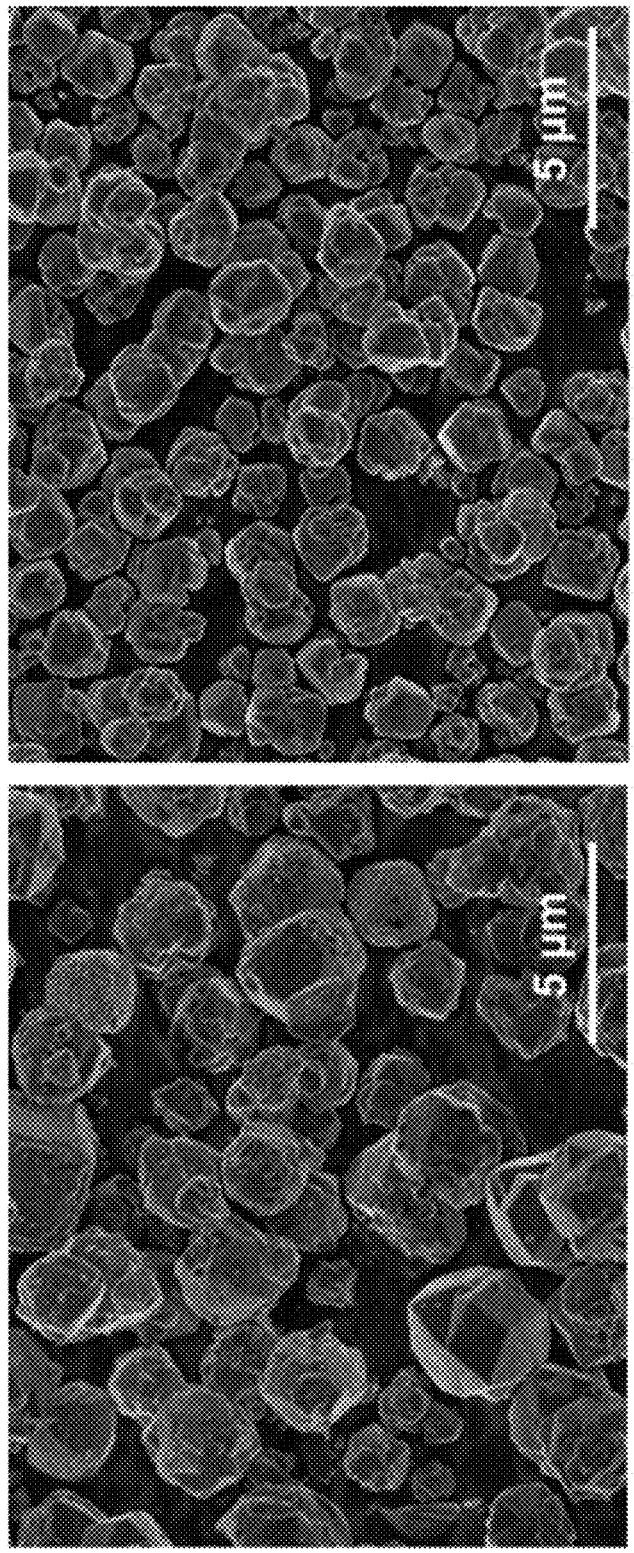
FIG. 12 shows scanning electron microscope images of commercial NaX zeolite and recrystallized NaX zeolite obtained from an acid solution produced in the process of synthesizing ZTCs.

FIG. 11 shows a comparison of nitrogen adsorption-desorption isotherms for the recrystallized NaX zeolite and the commercial NaX zeolite, and Table 3 summarizes the structural properties of both zeolites. Images of the recrystallized NaX zeolite and the commercial zeolite were obtained using a scanning electron microscope, and are shown in FIG. 12.

TABLE 3

Structural properties of recrystallized NaX zeolite and commercial NaX zeolite.

| NaX zeolite | $S_{BET}$ (m²/g) | $V_{micro}$ (cm³/g) | $V_{meso}$ (cm³/g) | $V_{total}$ (cm³/g) |
|---|---|---|---|---|
| Commercial | 821 | 0.36 | 0.01 | 0.37 |
| Recrystallized | 765 | 0.34 | 0.01 | 0.35 |

Table 3 shows that the micropore volume and surface area of the recrystallized NaX zeolite (0.34 cm³/g and 765 m²/g respectively) were only slightly less than those of the commercial zeolite (0.36 cm³/g and 821 m²/g respectively). The scanning electron microscope images show that both zeolites have similar morphologies, except that the recrystallized NaX zeolite has a smaller particle size. No distinguishable impurity phases were observed in the image of the recrystallized NaX zeolite. The results confirm that the recrystallized NaX zeolite can be reused as a template for synthesizing ZTCs.

What is claimed is:

1. A method for large-scale synthesis of a zeolite-templated carbon (ZTC), the method comprising the steps of:
    introducing a bed material comprising a zeolite to a fluidized bed reactor and heating the bed material to a first temperature between 550 degrees Celsius (° C.) and 800° C.;
    fluidizing the bed material with a fluidizing gas and maintaining the temperature of the bed material between 550° C. and 800° C.;
    introducing an organic carbon precursor while fluidizing the zeolite for a first period of time such that carbon is deposited on the zeolite by chemical vapor deposition to produce a zeolite-carbon composite;
    treating the zeolite-carbon composite with an acid solution such that the zeolite is dissolved and the ZTC is obtained.

2. The method of claim 1, wherein at least 100 grams of the ZTC is obtained.

3. The method of claim 1, wherein the fluidizing gas has an average gas velocity in the fluidized bed reactor that is between 5 centimeters per second (cm/s) and 25 cm/s.

4. The method of claim 1, wherein the step of fluidizing the bed material further comprises introducing the fluidizing gas such that the bed material is fluidized in a bubbling fluidization regime.

5. The method of claim 1, wherein the zeolite is a bead-type zeolite having a diameter between 100 micrometers (μm) and 1,000 μm.

6. The method of claim 1, wherein the organic carbon precursor comprises a molecule selected from the group consisting of: acetylene, ethylene, ethane, propylene, ethanol, and combinations of the same.

7. The method of claim 1, wherein the first period of time during which the bed material is fluidized with the organic carbon precursor is between 1 hour and 6 hours.

8. The method of claim 1, wherein the zeolite has a FAU structure and a ratio of silicon to aluminum that is between 1 and 1.4.

9. The method of claim 1, wherein the step of treating the zeolite-carbon composite with the acid solution further comprises maintaining pH of the acid solution between 2.5 and 3.5.

10. The method of claim 1, further comprising filtering the ZTC from the acid solution, and washing and drying the ZTC.

11. The method of claim 10, wherein the step of drying the ZTC comprises heating the ZTC to a second temperature between 80° C. and 120° C. for a second period of time that is between 1 hour and 24 hours.

12. A method for recovering a zeolite from a dissolved zeolite acid solution byproduct, the method comprising the steps of:
    synthesizing a zeolite-carbon composite by chemical vapor deposition on the zeolite, the zeolite having a FAU structure and a ratio of silicon to aluminum that is between 1 and 1.4, the zeolite-carbon composite comprising a ZTC on the zeolite;
    dissolving the zeolite with a fluorine-free acid solution to obtain the ZTC and produce the dissolved zeolite acid solution;
    neutralizing the dissolved zeolite acid solution with a base to precipitate an amorphous aluminosilicate;

crystallizing the amorphous aluminosilicate to obtain the zeolite.

13. The method of claim 12, further comprising recycling the zeolite for use in synthesizing the ZTC.

14. The method of claim 12, wherein the step of synthesizing the zeolite-carbon composite by chemical vapor deposition on the zeolite further comprises introducing an organic carbon precursor comprising a molecule selected from the group consisting of: acetylene, ethylene, ethane, propylene, ethanol, and combinations of the same.

15. The method of claim 12, wherein the fluorine-free acid solution comprises a mineral acid selected from the group consisting of: hydrochloric acid, sulfuric acid, phosphoric acid, and combinations of the same.

16. The method of claim 12, wherein the zeolite comprises NaX zeolite.

17. The method of claim 12, wherein the step of dissolving the zeolite with the fluorine-free acid solution further comprises maintaining pH of the fluorine-free acid solution between 2.5 and 3.5.

18. The method of claim 12, wherein the step of synthesizing the zeolite-carbon composite by chemical vapor deposition on the zeolite is carried out in a fluidized bed reactor.

19. The method of claim 18, wherein the fluidized bed reactor is operated such that the zeolite is fluidized in a bubbling fluidization regime.

20. The method of claim 12, wherein at least 100 grams of the ZTC is obtained.

* * * * *